A. MAIRE.
SPEED REDUCING GEAR FOR AVIATION ENGINES.
APPLICATION FILED AUG. 9, 1917.
1,263,689.
Patented Apr. 23, 1918.
2 SHEETS—SHEET 2.
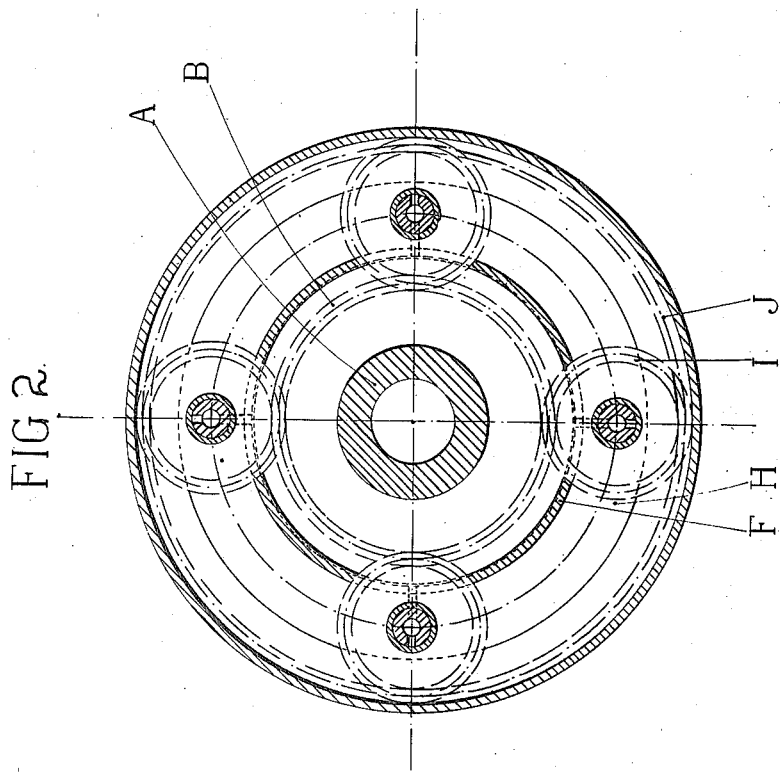

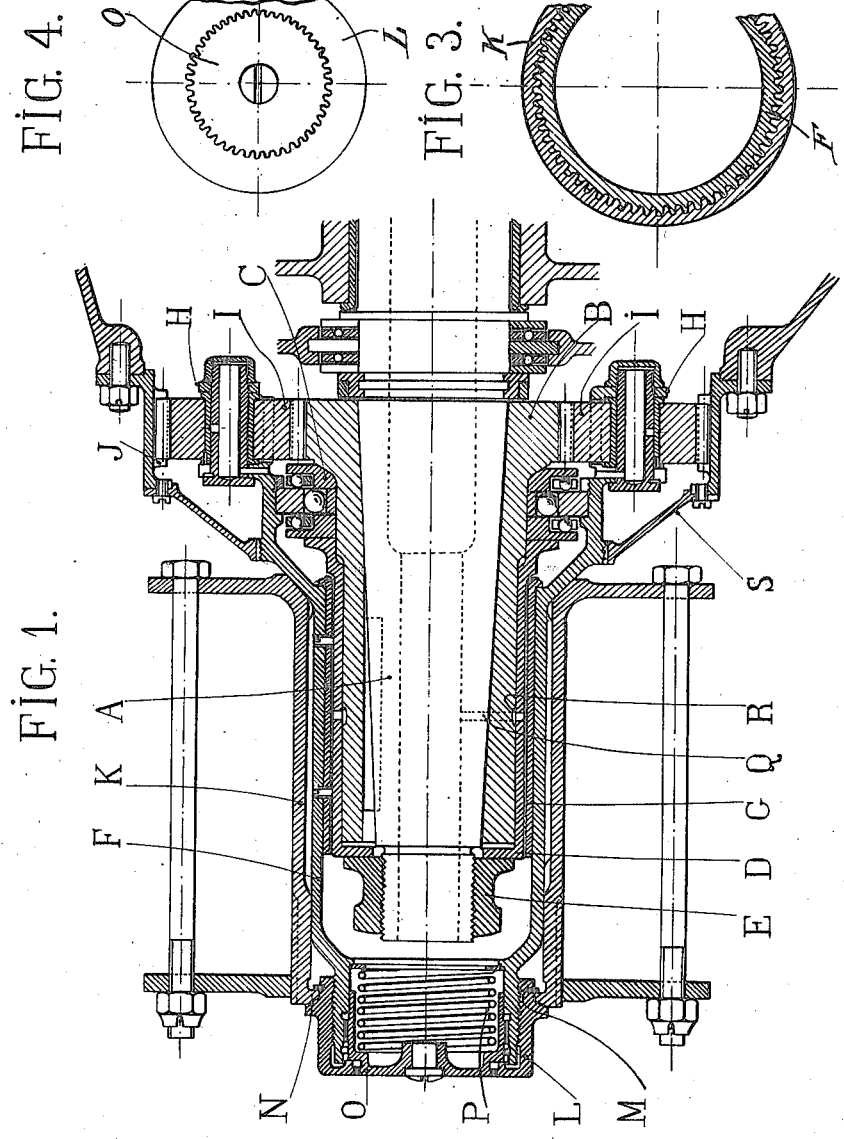

UNITED STATES PATENT OFFICE.

AUGUSTE MAIRE, OF ARGENTEUIL, FRANCE, ASSIGNOR TO SOCIETE LORRAINE DES ANCIENS ETABLISSEMENTS DE DIETRICH & CIE. DE LUNEVILLE, OF PARIS, FRANCE.

SPEED-REDUCING GEAR FOR AVIATION-ENGINES.

1,263,689.    Specification of Letters Patent.    Patented Apr. 23, 1918.

Application filed August 9, 1917. Serial No. 185,241.

*To all whom it may concern:*

Be it known that I, AUGUSTE MAIRE, citizen of the Republic of France, residing at Route de Bezons, Argenteuil, Seine & Oise, in the Republic of France, have invented new and useful Improvements in Speed-Reducing Gears for Aviation-Engines, of which the following is a specification.

For the purpose of providing a very powerful engine of relatively small weight, it is generally necessary that the speed of revolution of the engine crank shaft shall be very high.

On the other hand it has been found that screw propellers have a better efficiency when they run at a low speed, which allows of making them of very large diameter and very great width.

The present invention has now for its object to provide an improved speed-reducing gear for driving a screw propeller from an aviation engine at a suitable speed. This speed multiplying gear allows of retaining the center of the propeller in the main axis of the engine and of distributing the transmitted power over a very large number of teeth in the case of toothed wheels. The improved gear consists of a planetary driving system centered on the engine main shaft. The propeller hub is driven by the sleeve of the speed-reducing gear by means of flutes or grooves, and the fixing of the said gear is assured by a nut provided with an internally toothed brake, whereby the system can be easily dismounted.

One practical form of the improved apparatus is illustrated by way of example in the accompanying drawings in which:—

Figure 1 is a longitudinal section of the improved apparatus.

Fig. 2 is a cross section thereof.

Fig. 3 is a cross section showing the manner in which the propeller hub is driven by the sleeve of the speed-reducing gear.

Fig. 4 is a front view of the nut with brake teeth.

As shown, the improved speed-reducing gear is constructed as follows:

On the end of the crank-shaft, A, there is mounted a pinion B which is keyed upon the shaft. On this pinion there is fixed a ball bearing C which forms a double abutment, and which is fixed in place by means of a sleeve D tightened up by a nut E.

The ball bearing or stop serves to center the hub of the propeller sleeve F which is centered on the other hand by the gun metal ring G. The propeller sleeve F is driven by the following means:

It is formed at H with enlargements that allow of supporting the shafts on which the pinions I are mounted. These pinions engage on one hand with a toothed ring J fixed to the gear case or crank chamber, which is consequently fixed, while they engage on the other hand with the pinion B.

The arrangement constitutes a planetary system, and the reduction in speed of the propeller sleeve F relatively to the crank shaft is determined by the number of teeth in the fixed toothed ring and in the driving pinions.

In order to diminish the strain on the teeth that serve for driving, it is sufficient to provide a sufficient number of pinions. In Fig. 2 the system is shown as comprising four pinions.

The propeller is provided with a false hub K.

The driving of the propeller by the speed-reducing gear is effected by means of a series of teeth formed on one hand on the sleeve F and on the other hand on the false hub K, which teeth serve to distribute over a very large surface the power that is required for driving (Fig. 3).

On the other hand for the purpose of assuring a good centering of the propeller on the speed-reducing gear, a conical part is provided on the rear portion of the sleeve, while the false hub is centered in front on a cylindrical part. The fixing of the propeller on the false hub is effected by means of a nut L which is capable of turning relatively to the false hub, and forms as it were one piece with the latter as regards longitudinal motion. For this purpose the nut is formed with a segment M that serves to drive it for the purpose of unscrewing while in the screwing movement the hub is tightened against the conical part N.

In order to prevent the nut L from unscrewing during working, the speed-reducing gear comprises a cap O adapted to slide on the sleeve F, but forming as it were one piece with the said sleeve as regards rotary motion. A spring P has a constant tendency to force the cap O in the outward direction.

The cap O is formed with teeth of very fine pitch, and the nut is formed with similar teeth adapted to engage with the teeth of the cap O (Fig. 4).

When the fixing of the propeller is assured, the cap O is allowed to return by giving if necessary a small additional tightening movement in order that the cap O shall engage with its coöperating part. From this moment onward the whole system forms as it were one piece with the propeller sleeve, and the nut is eventually locked in place.

Lubrication of the speed-reducing gear is assured by oil under pressure supplied from the interior of the shaft, this oil passing through the passage Q into the groove R whence it effects the lubrication of the cap of the sleeve.

The oil after having lubricated the said cap, passes through the ball bearing C, and thence passes by centrifugal action to the axles of the satellite pinions; it lubricates the friction rings and thence escapes to the periphery where it lubricates the fixed teeth and consequently also the teeth of the satellite pinions. Any oil in excess returns to the crank chamber or gear casing whence it is drawn by the pump.

S is the casing fixed to the stationary toothed ring J for the purpose of preventing leakage of oil to the outside.

This casing S is bored. The propeller sleeve is provided with teeth of suitable direction which revolve with slight friction in the casing S, in such a manner that the oil which would have a tendency to flow away along the casing toward the outside, is thrown back into the interior by the reaction of the teeth.

It is to be understood that the crank shaft may be held in a fixed position in the longitudinal direction; in the example shown this connection is effected by means of a double ball bearing.

Having now described my invention, what I claim as new and desire to secure by Letters Patent is:

1. A speed-reducing gear for aviation engines comprising in combination: a driving shaft, a driving pinion fixed on the end of said driving shaft, a fixed toothed ring provided with internal teeth, centered on the driving shaft and arranged around the said pinion, a loose sleeve arranged around the driving shaft, means for centering said sleeve on the driving shaft, satellite pinions carried by the said sleeve and gearing on one hand with the driving pinion and on the other hand with the fixed toothed ring; a screw propeller, a false hub fixed to the said propeller and arranged around the said sleeve, means for enabling the sleeve to drive the false hub; means for centering the false hub on the sleeve and means for fixing the false hub, on the sleeve, substantially as described and for the purpose set forth.

2. A speed reducing gear for aviation engines comprising in combination: a driving shaft, a driving pinion and integral therewith a sleeve fixed on the end of said driving shaft, a fixed toothed ring provided with internal teeth, centered on the driving shaft and arranged around the said pinion, a loose sleeve arranged around the driving shaft and provided with teeth formed on its outer surface, satellite pinions carried by the said loose sleeve and gearing on one hand with the driving pinion and on the other hand with the fixed toothed ring, means for centering this sleeve on the driving shaft, a screw propeller, a false hub fixed to the said propeller, arranged around the said sleeve and provided with teeth formed on its inner surface, means for centering the false hub on the sleeve, and means for fixing the false hub on the sleeve, substantially as described and for the purpose set forth.

3. A speed reducing gear for aviation engines comprising in combination: a driving shaft, a driving pinion and integral therewith a sleeve, fixed on the end of said driving shaft, a fixed toothed ring provided with internal teeth, centered on the driving shaft and arranged around the said pinion; a loose sleeve arranged around the driving shaft and provided with teeth formed on its outer surface, satellite pinions carried by the said loose sleeve and gearing on one hand with the driving pinion and on the other hand with the fixed toothed ring, a gun metal ring carried by the loose sleeve, a ball bearing interposed between the said loose sleeve, and the sleeve of the driving pinion, a cap fixing this ball bearing, a nut tightening this cap, a screw propeller, a false hub fixed to the said propeller, arranged around the sleeve which carries the satellite pinions, said false hub and loose sleeve having conical and cylindrical surfaces provided with teeth formed on their inner surfaces, a nut fixing the false hub to the sleeve, and a nut brake provided on this nut, substantially as described and for the purpose set forth.

In testimony whereof I have signed my name to this specification in the presence of two subscribing witnesses.

AUGUSTE MAIRE.

Witnesses:
Louis Moses,
Chas. P. Pressly.